Sept. 10, 1940.    S. KAURA    2,214,023

TIRE GUARD

Filed Dec. 30, 1938

Inventor
Stanley Kaura
By Carl Miller
Attorney

Patented Sept. 10, 1940

2,214,023

UNITED STATES PATENT OFFICE 2,214,023

TIRE GUARD

Stanley Kaura, Fairmont, Nebr.

Application December 30, 1938, Serial No. 248,493

1 Claim. (Cl. 301—39)

The invention relates to tire guards particularly adaptable to wheels of vehicles equipped with pneumatic tires.

It is well known that upon deflation of a tire either as a result of a puncture or upon loss of air due to any other cause, that running on the flat tire even for a short distance will result in damage to the tire, whereupon it has become the universal practice to stop the vehicle whenever a flat tire occurs so as to either change the tire or repair the same. This always results in delay and inconvenience, and in many instances neither change nor repairs can be made at the place where the flat tire occurred as on a busy street or on a highway remote from a service station there being in the latter instance neither a spare or tools to effect the change or repair.

Accordingly, it is the principal object of this invention to provide a tire guard for each wheel of the vehicle arranged on one side of the pneumatic tire, the tire guard being rigidly secured to the tire rim of the wheel and being formed to provide a ground engaging portion adapted to engage the ground and to support the wheel in an operative position when the tire is deflated, functioning thereby to prevent the flat tire from being damaged as by getting pinched between ground (surface of pavement or road) and tire rim on wheel and also to permit the use of the wheel whereby the vehicle may be driven for any desired distance to a suitable place where change or repair of the tire may be effected.

This and other objects of the invention will be readily apparent from the following description of the invention considered with the accompanying drawing, wherein:—

Figure 1:
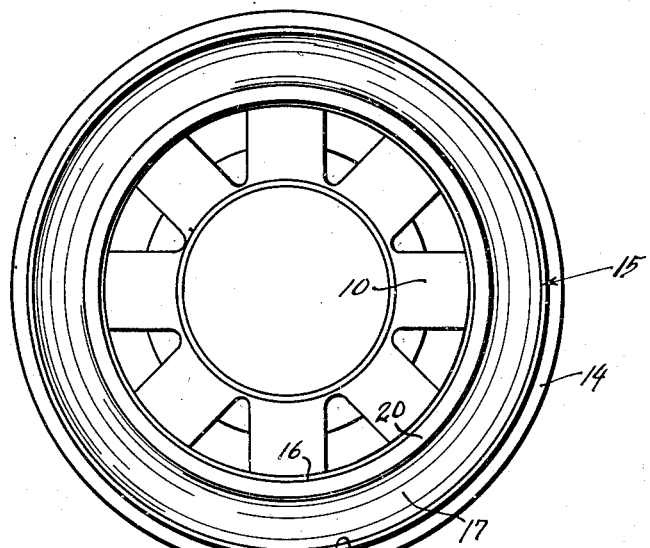
Figure 2:
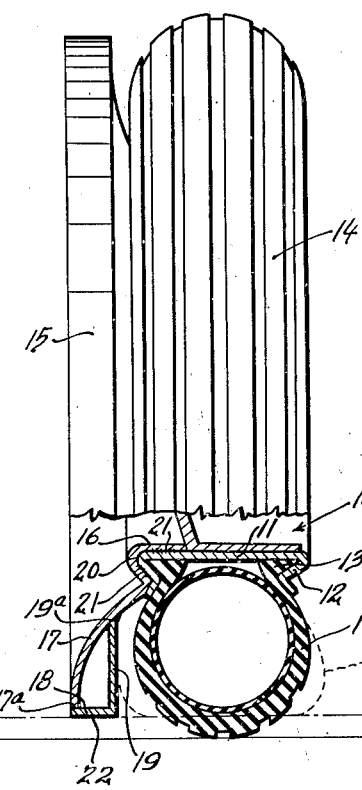

Figure 1 shows an elevational view of a wheel equipped with a pneumatic tire and a tire guard, and Figure 2 shows an end elevational view partly in section of the wheel shown in Figure 1, showing details of construction of the tire guard and the manner of mounting the same on the tire rim of the wheel.

Referring to the drawing in detail, 10 denotes a wheel of an automobile or other pneumatic tired vehicle provided with a metallic tire rim 11 having side flanges 12 adapted to retain the beads 13 of a pneumatic tire 14. The type of rim utilized and the manner of placing the tire thereon forms no part of the present invention, that shown in the figures being merely by way of illustrating a wheel with a rim thereon and a tire mounted on the rim.

Carried by the wheel 10 is a tire guard 15 shown mounted in a manner to be hereinafter described to one side of the wheel 10. In the preferred form shown, a single tire guard 15 is utilized for the wheel 10 and is mounted on the outer side thereof. The tire guard 15 is preferably made of pressed metal parts welded together to form an integral unit, one part comprising a rim engaging portion 16 having a main wall portion 17, and the other part comprising a ground engaging portion 18 and a reinforcing portion 19.

The main wall portion 17 of the tire guard 15 is convexly curved in a direction outwardly of the tire 14 terminating in a circular edge 17a which is adapted to abut the inside circular edge surface of the annular ground engaging portion 18, in the manner clearly shown in Figure 2, both the rim wall 17 and ground engaging portion 19 being permanently connected together at their abutting surfaces by welding. The ground engaging portion 18 is provided with an integral radial flange 19 defining a reinforcing wall, the inside circular edge 19a of which abuts the inside surface of the wall 17 and is permanently connected thereto by welding, thus providing an exceedingly strong and rigid wall construction for the tire guard as well as reinforcing the ground engaging portion 18.

Adjacent the rim portion 16 the wall 17 is provided with an annular recess 20 which is so shaped as to snugly receive therein a side flange 12 of the tire rim 11 as clearly shown, the rim portion 16 being formed to abut on the base of the tire rim 11. Any desired securing medium either permanent or removable may be utilized to rigidly connect the tire guard 15 to the tire rim 11. In the form of construction shown both the rim engaging portion 16 and wall recess portion 20 are spot welded to the tire rim 11, as at 21.

It will be observed from Figure 2 that the curved wall 17 of the tire guard flares outwardly from the tire rim 11 in progressively spaced relation to the tire 14 and that the ground engaging portion 18 is spaced inwardly of the tread of the tire when the same is in its normal inflated position as indicated by the space between dotted line A' and the full line A. In other words, the radial distance between the rim portion 16 and ground engaging portion 18 is less than the distance between the tire rim 11 and tread of the tire 14 when the same is in its normal inflated position. Thus the tire guard 15 does not interfere with normal operation of the tire 14. Preferably the ground engaging portion 18 is provided with a flat cylindrical ground engaging surface 22.

In the event the tire 14 becomes deflated from any cause the wheel 10 will settle down until the surface 22 of the ground engaging portion 18 of the tire guard will engage the ground (pavement or road surface) as indicated by the dotted line A', the tire 14 being deformed into the position indicated by the dotted lines 14', one side thereof being engaged by the reinforcing wall portion 19. The flat or deflated tire is thus relieved of any load thereon and is prevented from being deformed beyond the position shown by the dotted lines 14' obviating any possibility of the tire becoming damaged. With the tire 14 thus deflated, the wheel 10 supported by the ground engaging portion 18 is enabled to function thereby allowing the vehicle to be driven to a suitable place where the tire may be changed or repaired, or the vehicle may be operated until such time as it is convenient to change or repair the tire.

As will be evident from the above description the tire guard is simple in construction and cheap to manufacture, is of great strength as well as pleasing in appearance and is efficient and satisfactory in operation. While a preferred form has been shown and described, it is to be understood that various changes in the shape and construction of the tire guard may be resorted to within the scope of the appended claim.

Having thus described my invention, I claim as new and desire to secure by Letters Patent:

A tire guard for a wheel structure equipped with a pneumatic tire comprising an annular one-piece sheet metal stamping shaped to define a wall portion convexly curved in cross-section and an inner attaching portion terminating in a cylindrical flange adapted for attachment to said wheel structure, and an annular one-piece sheet metal stamping comprising a cylindrical tread portion and a radial wall portion arranged on the concave side of said convex wall portion with the peripheral edge of said wall portion connected with the cylindrical tread portion adjacent the axially outer edge thereof and with the inner peripheral edge of the radial wall portion connected with the concave surface of the convex-wall portion intermediate the ends thereof, both said connections being effected by welding, said radial wall portion functioning to reinforce the convex wall portion in sustaining the wheel load upon collapse of the tire and as an abutment for the side of said tire adjacent thereto when in said collapsed condition.

STANLEY KAURA.